United States Patent [19]
Mawhinney et al.

[11] Patent Number: 5,350,030
[45] Date of Patent: Sep. 27, 1994

[54] WHEELBARROW

[76] Inventors: James G. Mawhinney, 421 Cummer Ave Willowdale, North York, Ontario, Canada, M2M 2G3; Smity A. Anderson, 65A Emmett Avenue #1502, Toronto, Ontario, Canada, M6M 2E5

[21] Appl. No.: 104,533

[22] Filed: Aug. 11, 1993

[51] Int. Cl.⁵ .............................. B62D 51/04
[52] U.S. Cl. .................. 180/19.3; 180/65.2; 180/211; 180/215; 280/47.26; 298/2
[58] Field of Search ............ 180/65.1, 65.2, 65.3, 180/65.4, 211, 214, 215, 216, 19.1, 19.2, 19.3, 13; 280/47.31, 47.18, 47.26, 47.24; 298/2, 3

[56] References Cited

U.S. PATENT DOCUMENTS

| | | | |
|---|---|---|---|
| 2,918,133 | 12/1959 | Ericsson | 180/19.1 |
| 2,981,428 | 4/1961 | Noffsinger | 180/19.1 |
| 3,891,043 | 6/1975 | Valdex | 180/19.1 |
| 4,645,264 | 2/1987 | Morrison | 180/19.1 |
| 4,759,560 | 6/1988 | Virgulti | 280/47.33 |
| 4,811,988 | 3/1989 | Immel | 180/19.1 |

*Primary Examiner*—Richard M. Camby
*Attorney, Agent, or Firm*—Hugh E. Smith

[57] ABSTRACT

A motorized wheelbarrow with an off-center pivoting Load bucket makes unloading the wheelbarrow easy and quick. The pivot point underneath the bucket is located between a center point of the bottom of the load bucket and a back end of the bucket defined as the end closest to the human operator. A latch holds the bucket in a normal position in which the same is horizontally disposed. Upon release of the latch, since the pivot of the bucket is off-center, gravity will force the bucket to pivot forward into a dumping position, thereby emptying the contents of the wheelbarrow. The wheelbarrow is powered by an engine which further drives a generator, thereby providing electrical power at remote locations.

3 Claims, 3 Drawing Sheets

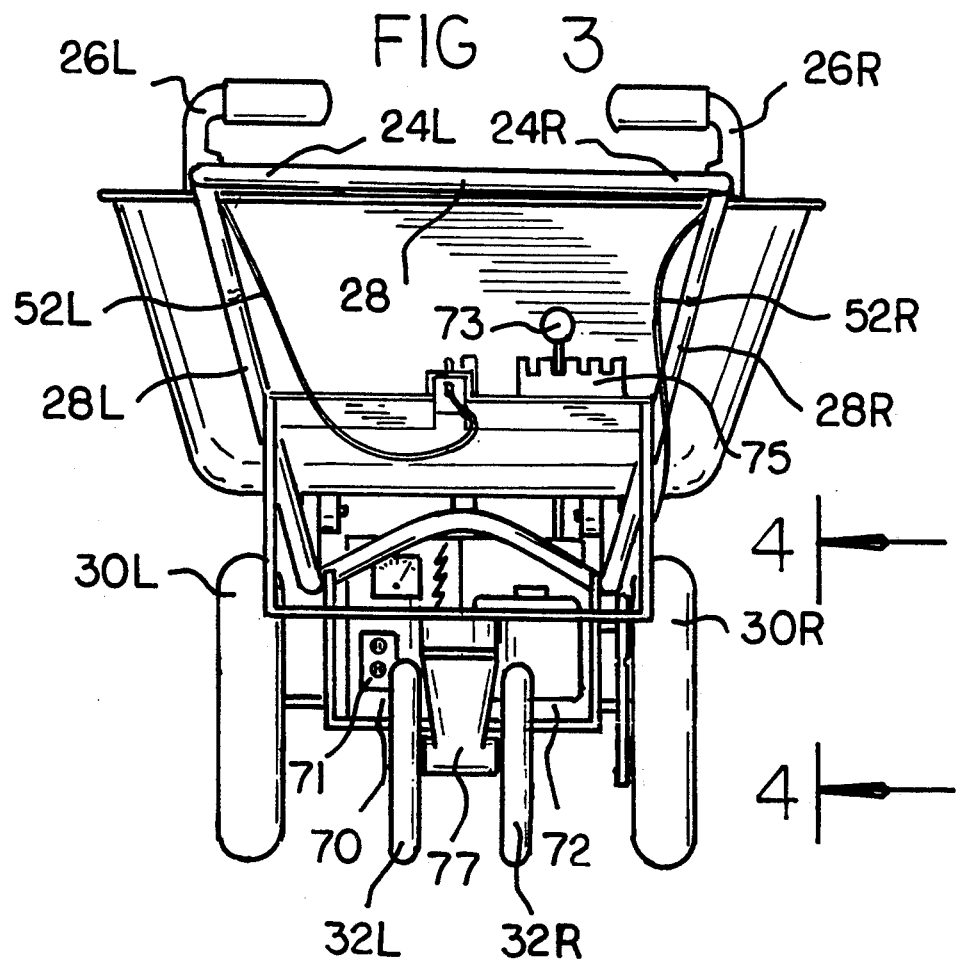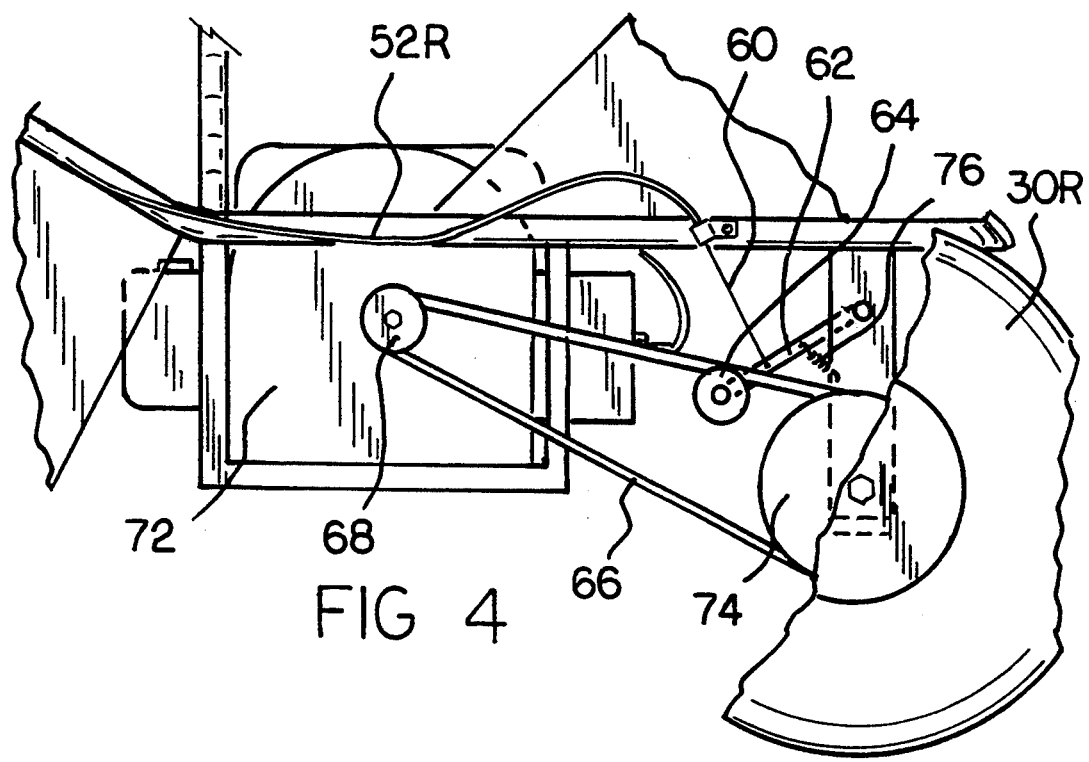

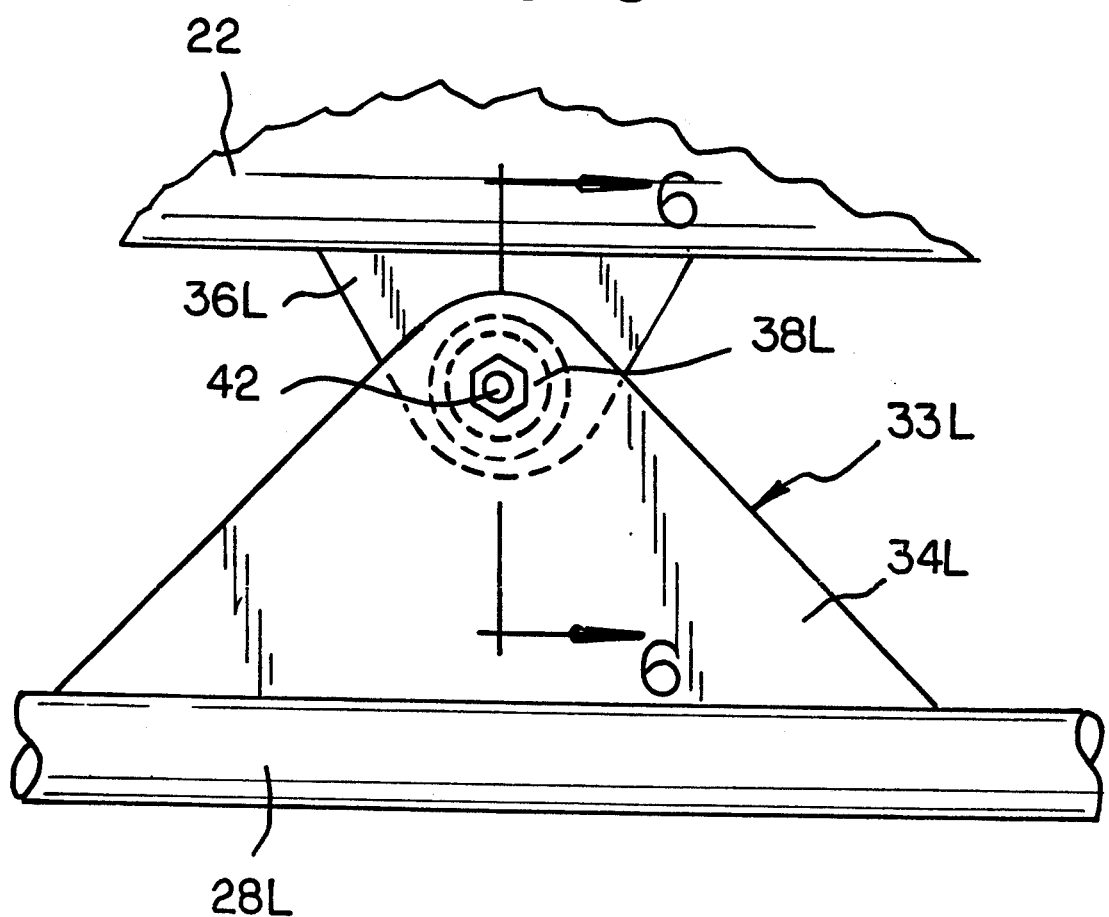
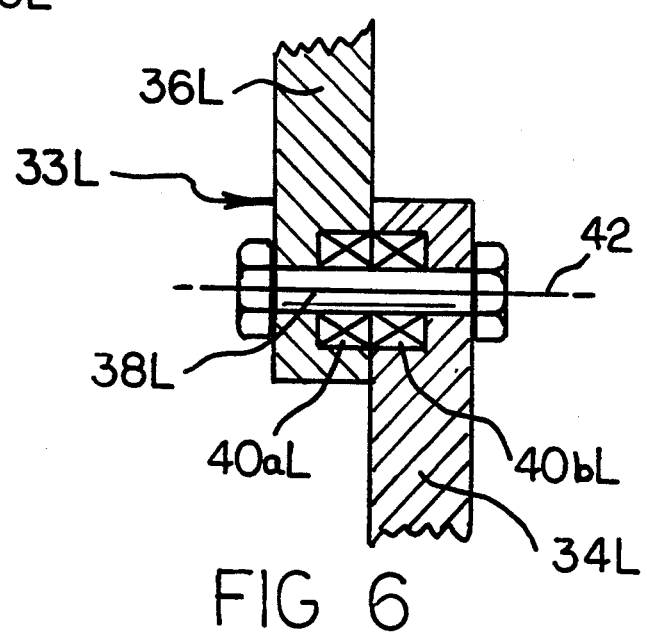

WHEELBARROW

BACKGROUND OF THE INVENTION

1. Field of the Invention

The present invention relates generally to wheelbarrows, and more particularly, to an engine powered wheelbarrow having a gravity tiltable load bucket especially adapted to effect an easy unloading of the bucket's contents.

2. Description of the Prior Art

Load carrying wheelbarrows which are pushed by humans to move materials from one location to another are well known and are illustrated in U.S. Pat. Nos. 3,565,453 and 4,921,305. It is also known to add an engine to a wheelbarrow to create a motorized wheelbarrow. See for example U.S. Pat. Nos. 3,791,470 and 4,589,508.

Thus, while the foregoing body of known prior art indicates it to be well known to use wheelbarrows, including motorized wheelbarrows, for moving materials from place to place, the provision of a more simple and cost effective device is not contemplated. Nor does the prior art described above teach or suggest a wheelbarrow having a gravity tilt load dumping mechanism which may be used by individuals to make unloading the wheelbarrow bucket much easier and quicker.

The foregoing disadvantages are overcome by the unique wheelbarrow of the present invention as will be made apparent from the following description thereof. Other advantages of the present invention over the prior art also will be rendered evident.

SUMMARY OF THE INVENTION

To achieve the foregoing and other advantages, the present invention, briefly described, provides a wheelbarrow with an off-center pivoting load bucket which makes unloading the wheelbarrow easy and quick. The pivot point underneath the bucket is located between a center point of the bottom of the load bucket and the back end of the bucket defined as the end closest to the human operator. A latch holds the bucket in its normal position. Upon release of the latch, since the pivot of the bucket is off-center, gravity will force the bucket to pivot forward into a dumping position, thereby emptying the contents of the wheelbarrow. The wheelbarrow includes an engine which powers the wheels and further powers a generator for providing electrical power at remote locations.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the preferred embodiment of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved wheelbarrow which has all of the advantages of the prior art and none of the disadvantages.

It is another object of the present invention to provide a new an improved wheelbarrow which may be easily and efficiently manufactured and marketed.

It is a further objective of the present invention to provide a new and improved wheelbarrow which is of durable and reliable construction.

An even further object of the present invention is to provide a new and improved wheelbarrow which is susceptible of a low cost of manufacture with regard to both materials and labor, and which accordingly is then susceptible of low prices of sale to the consuming public, thereby making such wheelbarrow available to the buying public.

Still yet a further object of the present invention is to provide a new and improved wheelbarrow which has a pivoting bucket/load container which can, upon release of a latch, tilt forward under the pressure of gravity to empty the contents of the bucket.

It is still a further object of the present invention to provide a new and improved wheelbarrow having the three or preferably four wheels, at least one of which can be powered by an engine.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein:

FIG. 3 is a rear elevation view showing the preferred embodiment of a wheelbarrow in accordance with the present invention.

FIG. 4 is a side elevation view, having a component partially removed, of a portion of the wheelbarrow of FIG. 3, as viewed from line 4—4 thereof in accordance with the present invention.

FIG. 5 is an enlarged side elevation view showing in more detail a pivot mechanism of the preferred embodiment of the wheelbarrow taken from circle 5 in FIG. 1.

FIG. 6 is a cross-sectional view of the pivot mechanism of the wheelbarrow of the present invention taken along line 6—6 of FIG. 5.

DESCRIPTION OF THE PREFERRED EMBODIMENT

With reference now to the drawings, a new and improved wheelbarrow embodying the principles and concepts of the present invention will be described.

Figure 1:
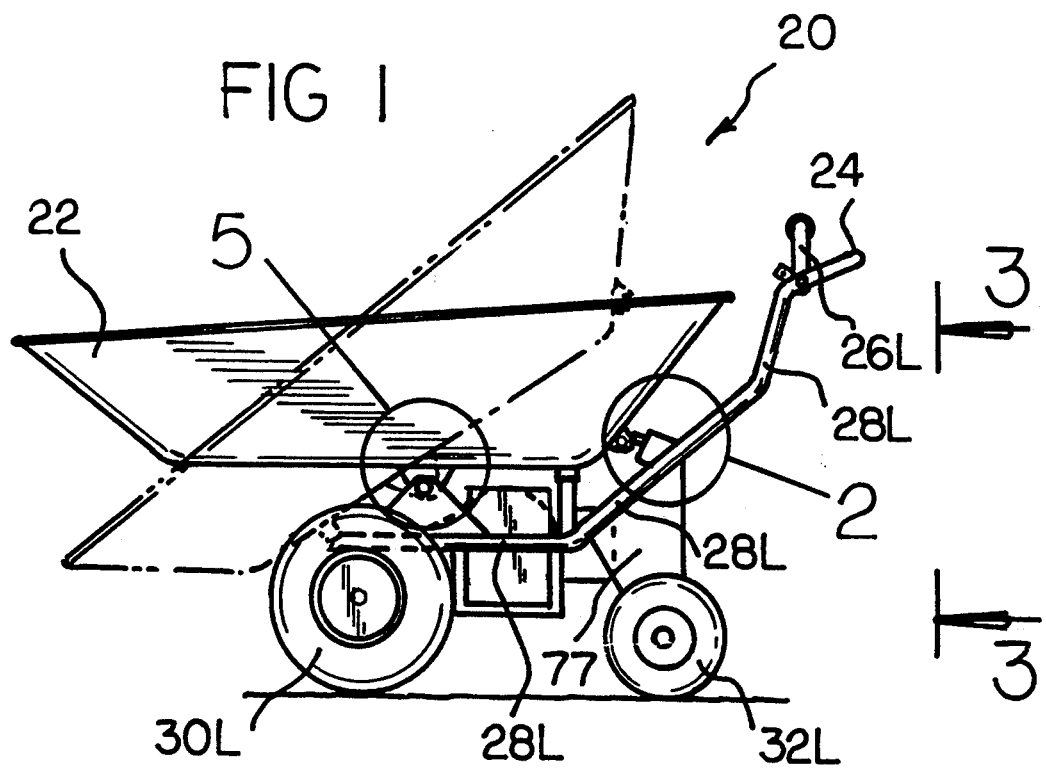
FIG. 1 is a side elevation view showing the preferred embodiment of a wheelbarrow in accordance with the present invention.

Turning initially to FIG. 1, there is shown a first exemplary embodiment of a wheelbarrow of the present invention as generally designated by the reference numeral 20. In its preferred form, the wheelbarrow 20 has a tilting bucket 22 for holding a load that is to be transported from one location to another. A person using the wheelbarrow 20 holds onto handles 24L and 24R, as best illustrated in FIG. 3, which are actually both part of one long handle frame bar 28. A left hand release lever 26L can be actuated to allow bucket 22 to tilt forward and empty its contents. A right hand release lever 26R can be used to actuate the powered rotation of a pair of front wheels 30L and 30R to propel the wheelbarrow 20 in a forward or reverse direction. The reference numerals 28L and 28R are used to designate the left and right hand sides respectively of a portion of the handle frame bar 28 below the two handles 24L and 24R. The wheelbarrow 20 comprises preferably four wheels which are referenced as the right front wheel 30R, the left front wheel 30L, the right rear wheel 32R, and the left rear wheel 32L, as best illustrated in FIG. 3.

Now referring to FIGS. 5 and 6, the tilting mechanism of the bucket 22 is preferably comprised of a pair of pivots 33L and 33R located beneath the bucket 22. However, only the left side pivot 33L is shown in the Figures though a right side pivot is preferably also used. Alternatively, a single pivot could be used, or more than two pivots could be used. From here on the left pivot 33L will be described with the understanding that a substantially identical right side pivot is also present. A left pivot set-back plate 34L is fixed to and located above the left hand side 28L of handle frame bar 28. Underneath the bucket 22 is a pivot set-back plate 36L. A pivot rod 38L is placed through holes in the pivot plates 36L and 34L. A center line of the holes in the pivot plates 36L and 34R and also the pivot rod 38L is designated as pivot center line 42. A first pivot bearing 40aL for the handle frame bar left pivot set-back plate 34L and a second pivot bearing 40bL for bucket 22 bottom pivot set-back plate 36L enable the plates 34L and 36R to rotate easily around the pivot rod 38L.

Figure 2:
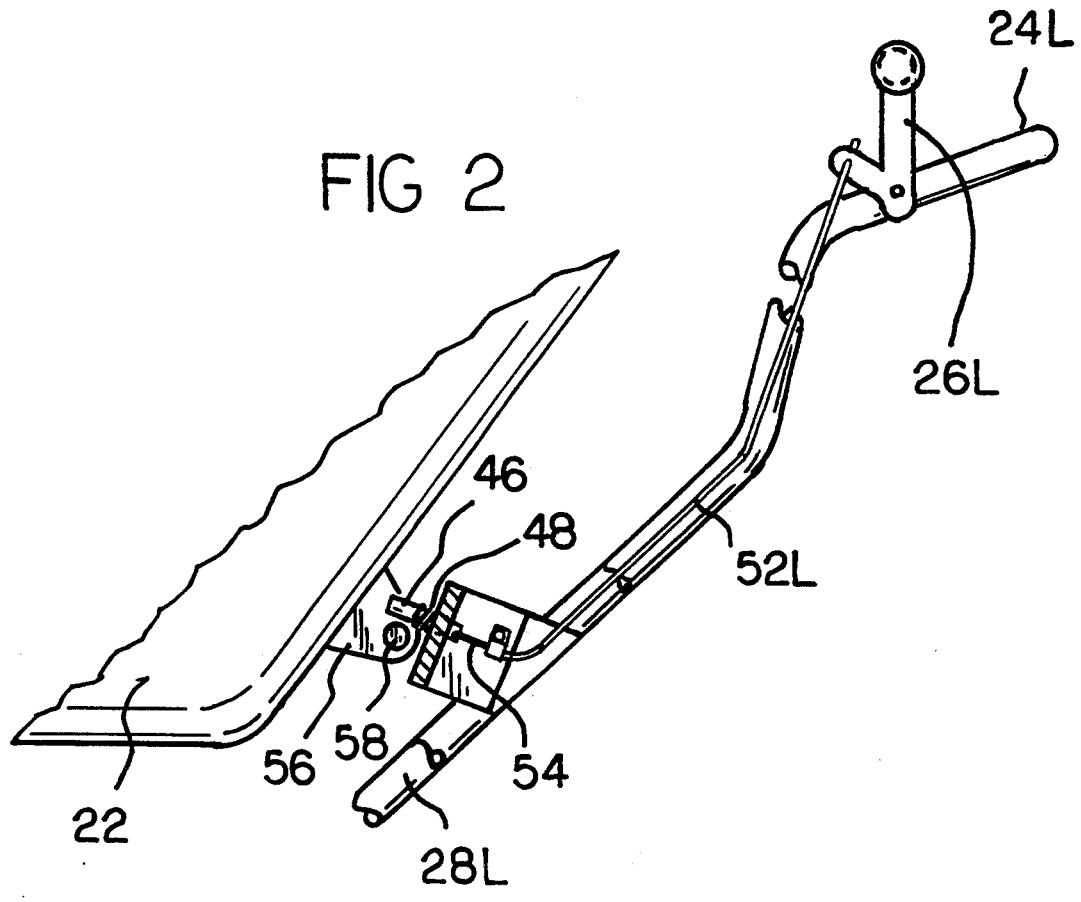
FIG. 2 is an enlarged side elevation view of the handle of the wheelbarrow detailing an area designated by circle 2 of FIG. 1 in accordance with the present invention.

Referring back to FIGS. 1 and 2, the bucket 22 can be kept in two positions, a load carrying position and a load dumping position. Both positions are shown in FIG. 1. The bucket 22 is held in the load carrying position by a pin 46 which is urged against a knob 58 holding down the bucket 22. The knob 58 is fixed to a plate 56 which is in turn secured to a back of the bucket 22. A spring 48 urges the pin 46 outward, holding it in place. Pulling lever 26L pulls pin 46 in against a force of the spring 48 letting knob 58 pass by pin 46, thereby letting the bucket 22 pivot away such that the bucket is dropped from the load carrying position to the load dumping position. A wire 54 runs inside a cable 52L between the tilt release lever 26L and the pin 46.

An important aspect of the present invention is that the pivot axis 42 is off-center towards a back end of the wheelbarrow 20 defined as the end where the person using the wheelbarrow stands. By placing the pivot axis 42 towards the back, when the mechanism holding the bucket 22 in its load carrying position is released, gravity will naturally force the bucket 22 to pivot toward the front of the wheelbarrow 20, thereby dumping the load in front of the wheelbarrow.

The wheelbarrow 20 is preferably powered by an engine 72 (either electric or gas powered) so that heavy loads can be moved by anybody, regardless of their strength. The preferred embodiment of the powering system is shown in FIGS. 3 and particularly 4 and includes a gasoline powered engine 72 coupled to the front wheels 30L and 30R and further coupled to a generator 70. The generator 70 is operable to supply electrical power through an unlabeled electrical outlet to electrically operated items, such as power tools and the like at remote locations. The generator 70 preferably outputs AC electrical power, although a DC generator may also be provided.

The engine 72 is mechanically coupled to both the generator 70 and an internal, unlabeled gear box which allows a user to select between forward and reverse gears, as well as high and low gear ratios, through a conventional gearing arrangement coupled to a gear selector 73, as best illustrated in FIG. 3. The gear selector 73 may be selectively positioned by the user within a shifting grid 75 to select an appropriate gear ratio and direction.

To drive the wheels 30L and 30R, the engine 72, through a well understood use of the gear box, turns a power pulley 68 around which goes a drive belt 66. The drive belt 66 also goes around a wheel pulley 74 mechanically coupled to the pair of wheels 30. The drive belt 66 is loose. When the motor 72 turns the power pulley 68, the drive belt 66 is too loose to be forced to move. The power pulley 68 just slides under the belt. To cause the wheelbarrow 20 to move, hand lever 26R is activated. A wire 60, mostly inside cable 52R, extends between the hand lever 26R and a rod 62. At one end of rod 62 is a pulley 64 over which runs drive belt 66. A spring 76 normally urges rod 62 down such that little pressure is placed by pulley 64 against belt 66. Activating lever 26R causes wire 60 to pull rod 62 upward, forcing belt 66 to get tighter. The tightening of belt 66 allows the power pulley 68 to move the drive belt 66 which turns the wheel pulley 74, thus turning the wheels 30 which causes the wheelbarrow 20 to move in a direction and speed as selected by the gear box.

Use of the wheelbarrow 20 of the present invention is very simple. While the wheelbarrow 20 is in the first position, the load carrying position, the bucket 22 can be filled with some type of heavy load (for example dirt). The engine 72 can be started causing pulley 68 to turn (but not belt 66 since it is too loose). Activating right hand lever 26R causes wire 60 to pull rod 62 upward (against the force of spring 76) along with pulley 64. As pulley 64 tightens belt 66, pulley 68 is able to force the belt 66 to move. The moving belt 66 forces pulley 74, and an axle supporting the wheels 30 to which it is concentrically attached, to turn.

The wheelbarrow 20 can be turned in the typical way by putting appropriate manual force on the handles 24L and 24R, thereby causing a rear wheel pivot 77 to rotate. The rear wheel pivot 77 provides a support for the rear wheels 32L and 32R which allows the same to pivotally rotate. In this manner, the wheelbarrow 20 may be turned without a need to lift a weight of the contents of the bucket 22 as must be done with conventional wheelbarrows. Through a use of the aforementioned structure, the wheelbarrow 20 may be moved to a desired location where its load can then be dumped.

The load is dumped by activating hand lever 24L which pulls wire 54 which in turn pulls pin 46 against spring 58. Once pin 46 passes by knob 58, because the pivot is offset towards the back of the wheelbarrow 20, gravity forces the bucket 22 to tilt forward dumping all or most of the contents onto the ground. After all of the contents of the bucket 22 have been emptied, the back of the bucket 22 can be pulled back down while the hand lever 24L is held in. Once the knob 58 passes the pin 46, the lever 24L can be let out, letting the pin 46 back out to hold the bucket 22 in the load carrying position. The bucket 22 can then be filled and used again.

It is apparent from the above that the present invention accomplishes all of the objectives set forth by providing a new and improved wheelbarrow which can be comprised of: a load holding means, such as a bucket like that shown in the figures, supported by at least one wheel, and preferably four wheels; the load holding means having an off-center pivot means for pivoting the load holding means between a load holding position and a load dumping position; a locking means, such as a pin holding a knob, for locking the load holding means in the load holding position; and a releasing means, such as a lever which pulls a pin away from a knob allowing the knob to pass by the pin, for unlocking the locking means to release the load holding means, whereby the force of gravity pivots the load holding means.

The wheelbarrow can further be comprised of a powering means, such as a gasoline engine or an electric motor, for providing power to turn at least one of the at least one wheel.

The wheelbarrow can further be comprised of a generator for providing electrical power at remote locations.

The wheelbarrow can further be comprised of an activating lever for releasing the releasing means.

The wheelbarrow can further be comprised of an activating lever for activating the turning of the at least one wheel and for deactivating the turning of the at least one wheel.

The wheelbarrow can further be comprised of a wheel pivot which allows at least one wheel to pivot, thereby allowing a user to turn the wheelbarrow without a lifting thereof.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein. Hence, the proper scope of the present invention should be determined only by the broadest interpretation of the appended claims so as encompass all such modifications and equivalents.

What is claimed as being new and desired to be protected by Letters Patent of the United States is as follows:

1. A new and improved wheelbarrow comprised of:
    a handle frame bar defining a straight handle, and a left handle frame bar side and right handle frame bar side;
    a bucket pivotally coupled to said handle frame bar by a tilting mechanism, said tilting mechanism comprising a left handle frame bar pivot set-back plate fixedly secured to said left handle frame bar side, a right handle frame bar pivot set-back plate fixedly secured to said right handle frame bar side, a left bucket bottom pivot set-back plate secured to said bucket in an off-centered manner and pivotally coupled to said left handle frame bar pivot set-back plate by a pivot rod, and a right bucket bottom pivot set-back plate secured to said bucket in an off-centered manner and pivotally coupled to said right handle frame bar pivot set-back plate by a further pivot rod;
    a left front wheel rotatably coupled to said left handle frame bar side, a right front wheel rotatably coupled to said right handle frame bar side, and an axle coupled to both said front wheels;
    a left rear wheel and a right rear wheel;
    a rear wheel pivot rotatably coupled to said handle frame bar, said rear wheel pivot being operable to rotatably support both said left and right rear wheels, thereby allowing said rear wheels to turn said wheelbarrow;
    an internal combustion engine secured to and supported by said handle frame bar;
    a gear box having a forward gear and a reverse gear, said gear box being in mechanical communication with both a pulley system means for transmitting mechanical power to said front wheels and said engine; and;
    a generator in mechanical communication with said engine for generating electrical power.

2. The new wheelbarrow of claim 1, wherein said pulley system means comprises a power pulley coupled to a shaft of said gear box, a wheel pulley coupled to said axle, a pulley pivotally and rotatably coupled to said handle frame bar, and a drive belt passing over said pulleys, whereby said pulley may engage said drive belt to increase a tension thereof, thereby causing said power pulley to frictionally engage said drive belt to transmit torque through the same to said wheel pulley.

3. A wheelbarrow comprised of:
    a handle frame bar defining at least one handle and a pair of opposed sides;
    a bucket pivotally coupled to said handle frame bar upon a tilting mechanism, said tilting mechanism being selectively operable by a user to allow said bucket to pivot with respect to said handle frame bar, said tilting mechanism comprising at least one handle frame bar pivot set-back plate fixedly secured to said handle frame bar, and at least one bucket bottom pivot set-back plate secured to said bucket, said at least one handle frame bar pivot set-back plate and said at least one bucket bottom pivot set-back plate being pivotally coupled together by a pivot rod, said at least one bucket bottom pivot set-back plate being fixedly secured to said bucket in an area between a center of said bucket and a back end thereof;

a pair of front wheels each rotatably coupled to one of said opposed sides of said handle frame bar;

a plurality of rear wheels;

a rear wheel pivot rotatably coupled to said handle frame bar, said rear wheel pivot being operable to rotatably support said plurality of rear wheels, thereby allowing said plurality of rear wheels to turn said wheelbarrow;

an engine means secured to said handle frame bar and coupled to at least one of said pair of front wheels for rotating said wheels, said engine means comprising an internal combustion engine;

a generator means mechanically coupled to said engine means for generating electrical power; and, a gear box in mechanical communication with said internal combustion engine, said gear box having both a forward clear and a reverse gear.

* * * * *